United States Patent
Gauthier

(10) Patent No.: US 12,186,961 B2
(45) Date of Patent: Jan. 7, 2025

(54) METHOD OF FORMING A REUSABLE SURGICAL IMPLEMENT

(71) Applicant: Gauthier Biomedical, Inc., Grafton, WI (US)

(72) Inventor: Michael T. Gauthier, Grafton, WI (US)

(73) Assignee: Gauthier Biomedical, Inc., Grafton, WI (US)

( * ) Notice: Subject to any disclaimer, the term of this patent is extended or adjusted under 35 U.S.C. 154(b) by 679 days.

(21) Appl. No.: 17/474,994

(22) Filed: Sep. 14, 2021

(65) Prior Publication Data

US 2022/0080641 A1    Mar. 17, 2022

Related U.S. Application Data

(60) Provisional application No. 63/077,816, filed on Sep. 14, 2020.

(51) Int. Cl.

| | | |
|---|---|---|
| B29C 48/00 | (2019.01) |
| B29C 48/09 | (2019.01) |
| B29C 57/10 | (2006.01) |
| B29C 65/00 | (2006.01) |
| B29C 65/48 | (2006.01) |
| B29K 19/00 | (2006.01) |
| B29K 83/00 | (2006.01) |
| B29L 31/00 | (2006.01) |

(52) U.S. Cl.
CPC ........ *B29C 48/0021* (2019.02); *B29C 48/022* (2019.02); *B29C 48/09* (2019.02); *B29C 57/10* (2013.01); *B29C 65/48* (2013.01); *B29C 66/50* (2013.01); *B29K 2019/00* (2013.01); *B29K 2083/00* (2013.01); *B29L 2031/7546* (2013.01)

(58) Field of Classification Search
None
See application file for complete search history.

(56) References Cited

U.S. PATENT DOCUMENTS

| | | | | |
|---|---|---|---|---|
| 3,673,040 A | * | 6/1972 | Hill | ........................ B29C 63/18 |
| | | | | 156/310 |
| 7,651,578 B2 | * | 1/2010 | Sharrow | ............... A61M 25/09 |
| | | | | 600/585 |

(Continued)

FOREIGN PATENT DOCUMENTS

GB         2165910 A    *    4/1986       ............. B25B 27/28

*Primary Examiner* — Barbara J Musser
(74) *Attorney, Agent, or Firm* — Boyle Fredrickson S.C.

(57) ABSTRACT

A reusable surgical implement or template is provided that is formed of a core positioned within an enclosure. The core is formed of a suitable rigid, and optionally flexible material to enable the implant to conform to the desired use for the implement in a surgical procedure. The material forming the enclosure is also stretchable and flexible to accommodate the configuration and/or any flexing of the core, and is biologically inert to enable the implant to be sterilized after use for use in subsequent surgical procedures while protecting the material forming the core. The enclosure can be molded around the core in separate portions or components using multiple molding steps to form an enclosure with the desired attributes. The enclosure can also be preformed and the core inserted and secured within the enclosure using an adhesive to form the implement in an alternative manner.

14 Claims, 16 Drawing Sheets

(56) References Cited

U.S. PATENT DOCUMENTS

| | | | |
|---|---|---|---|
| 9,588,454 B2 * | 3/2017 | Yamaguchi | G03G 15/1685 |
| 10,786,257 B2 * | 9/2020 | Mathis | A61B 1/00085 |
| 2018/0177532 A1 * | 6/2018 | Gauthier | A61B 17/702 |

* cited by examiner

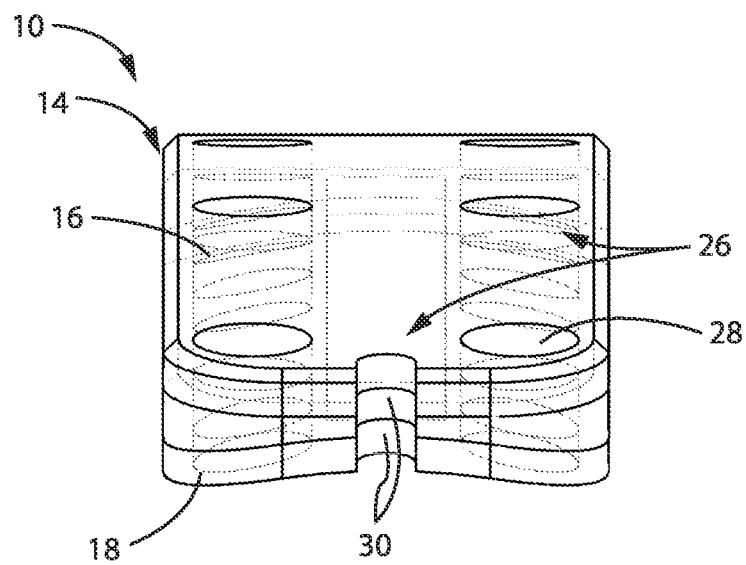
FIG. 7
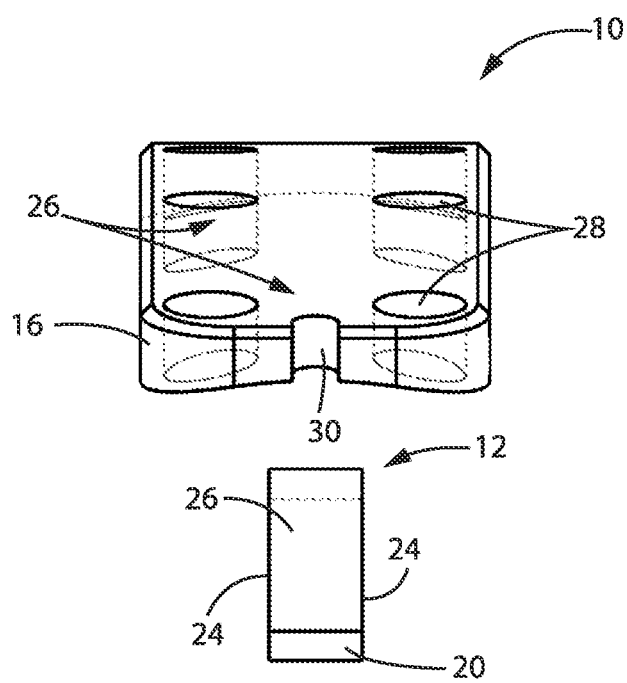
FIG. 8
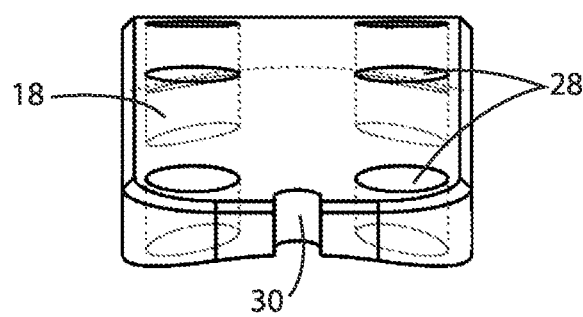

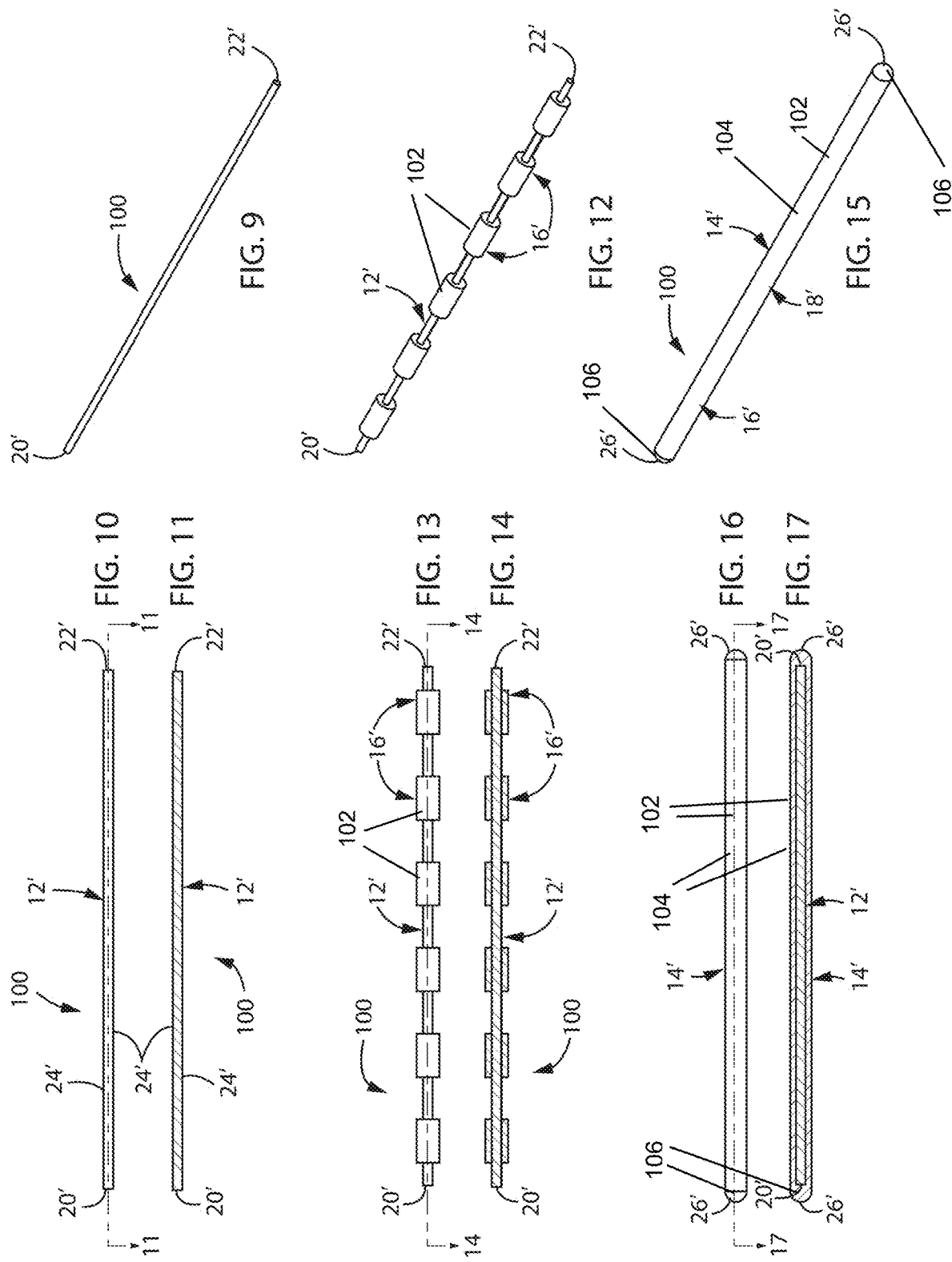

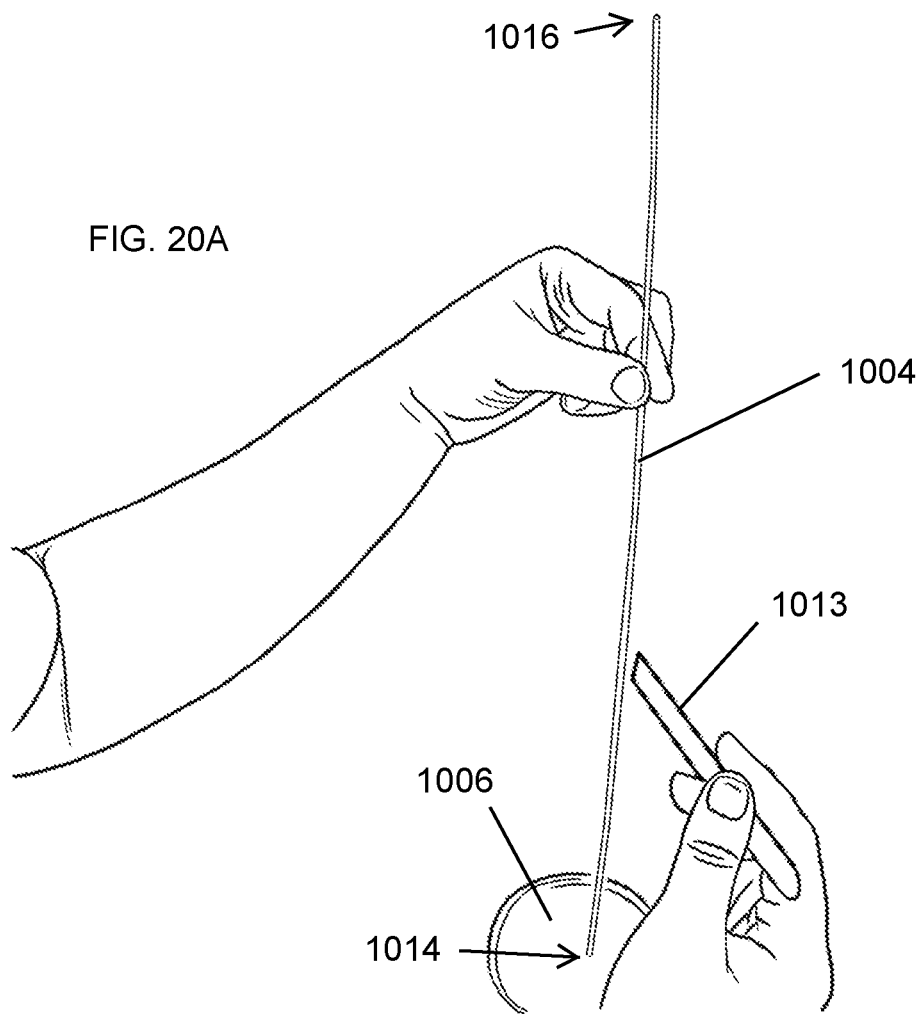

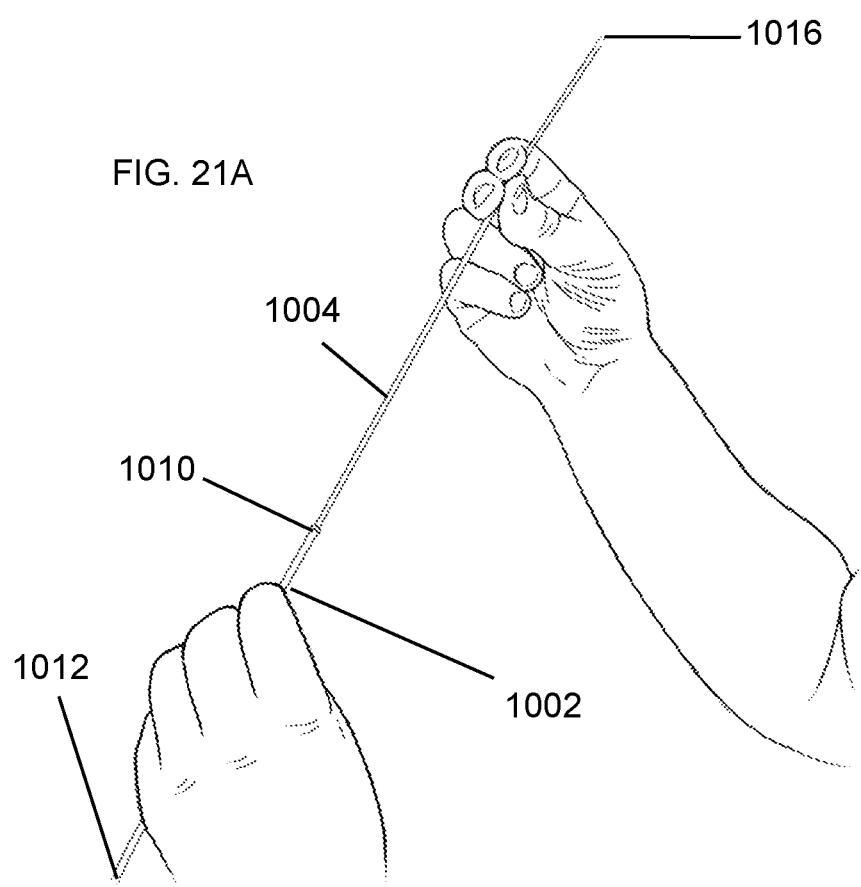

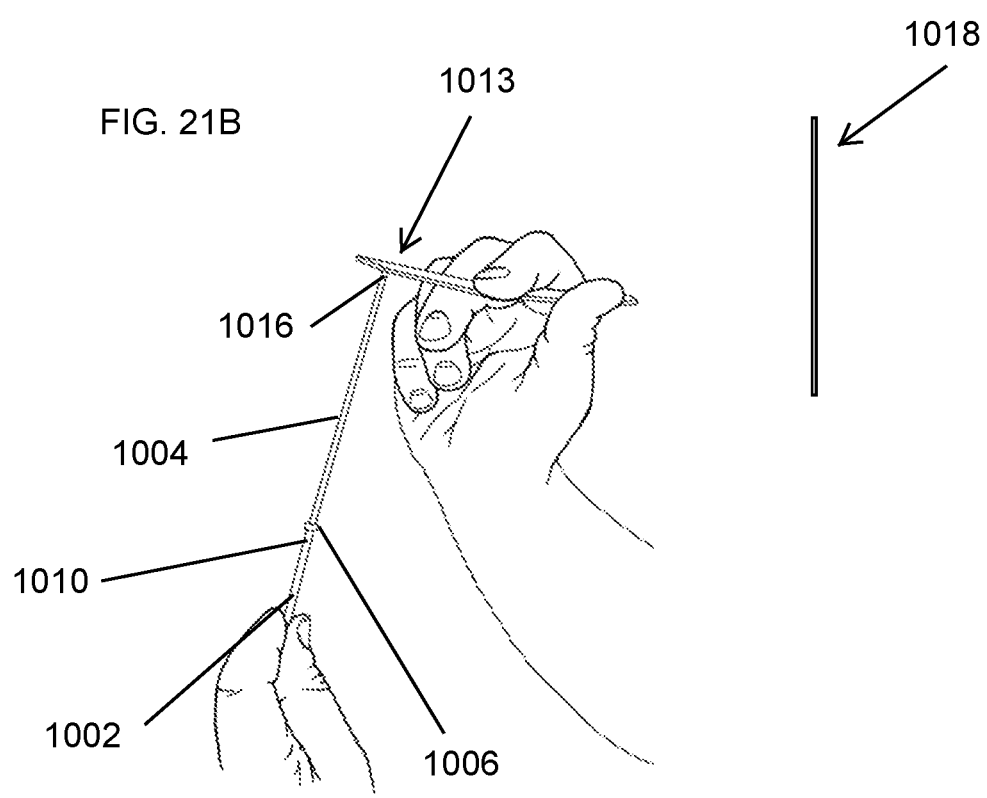

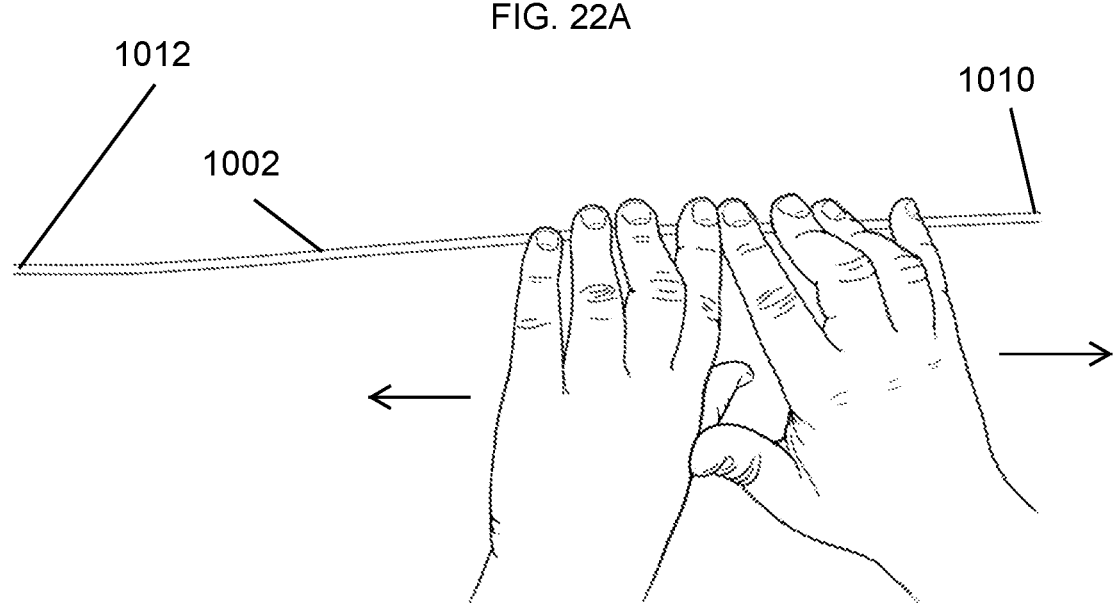

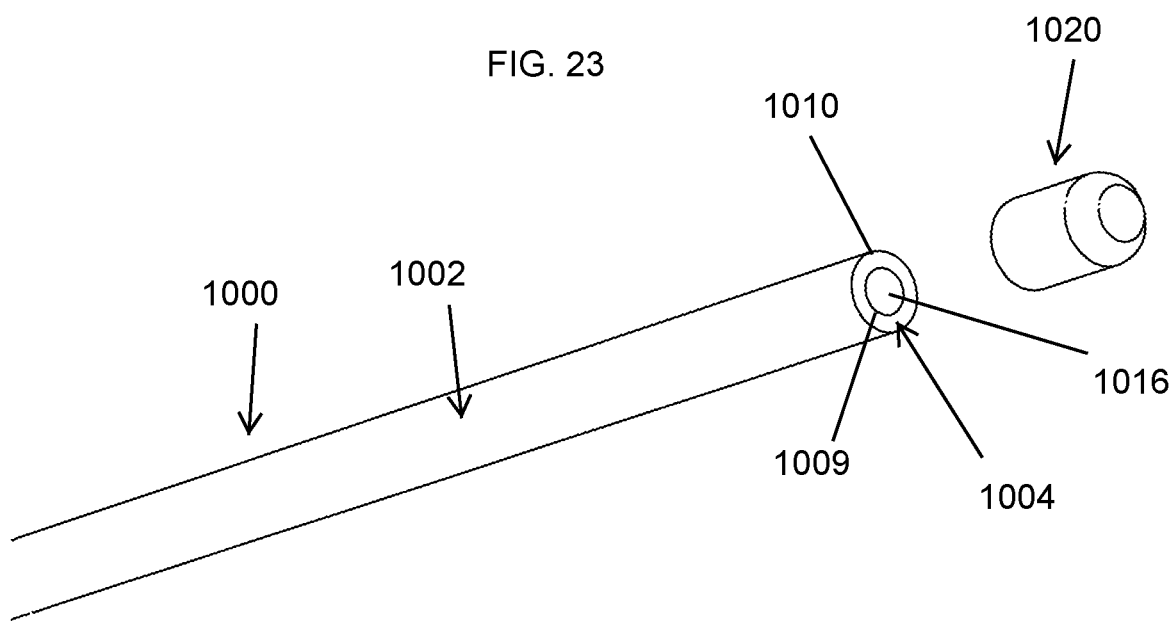

METHOD OF FORMING A REUSABLE SURGICAL IMPLEMENT

CROSS-REFERENCE TO RELATED APPLICATIONS

The present application claims priority from U.S. Provisional Patent Application Ser. No. 63/077,816, entitled A Method Of Forming A Reusable Surgical Implement, filed on Sep. 14, 2020, the entirety of which is expressly incorporated herein by reference for all purposes.

FIELD OF THE INVENTION

The present invention relates generally to items used in surgical procedures, and more particularly to a process for providing exterior coatings on those items and the items formed by the construction process.

BACKGROUND OF THE INVENTION

There are many types of devices that are used in surgical procedures. The devices enable a physician to perform the multitude of tasks required to successfully complete the procedure. Oftentimes, the procedure that the physician needs to perform requires the use of items, implements or other tools that require a certain amount of rigidity in the tool in order for the tool to effective in its particular use in the procedure. As such, many of these items or tools are formed of a generally rigid material, such as a metal, that provides the desired amount of rigidity.

However, with these tools formed at least partially of metal, the nature of the metal creates problems with regard to the re-use of the tool. The reason for this is that the metal, as well as any coating applied to the exterior of the metal, such as an anodized coating which is necessary for implements that are formed of titanium, must be sterilized after each use. With certain metals and coatings, the sterilization process can be problematic, as the metals and/or coating can become brittle or otherwise damaged upon sterilization after an initial use. Any damage done to the metal and/or coating can cause issues with the stability or integrity of the implement during subsequent uses which consequently can endanger the patient.

Thus, it is desirable to develop implements, and processes for their construction or formation, that are formed of metal and a material that enables the implement/tool incorporating the metal to be sterilized and reused in multiple procedures without detrimentally affecting the tool and/or the metal component(s) of the tool.

SUMMARY OF THE INVENTION

Briefly described, one exemplary aspect of the present disclosure provides an implement or tool formed of a substantially rigid, but optionally somewhat flexible core material that is enclosed within an inert material. The inert material provides a protective barrier around the core material and is capable of being sterilized after use without degrading the protective properties of the inert material to enable the implement to be reused. The inert material is molded, formed or otherwise positioned over the core material to conform to the shape of core and provide the appropriate size, shape configuration and other attributes to the actual implement for use by a physician in the particular procedure. Once used, the implement can be removed and subsequently sterilized, such as in an autoclave, for additional uses.

According to another exemplary aspect of the present disclosure, in addition to be able to withstand the conditions of a sterilization procedure to protect the core material integrity, the inert material is sufficiently flexible and stretchable to accommodate any required flexibility of the core material while maintaining the core enclosed within the inert material. Thus, the implement can be bent in order to accurately conform to the proper location and configuration of for the implement when positioned within the body of the patient during the procedure and the inert material will maintain its conformance with the shape of the core.

According to a further exemplary aspect of the present disclosure, the enclosure material can be pre-formed and subsequently placed or otherwise positioned around the core to form the implement or template. In one method, the enclosure is molded and cured prior to being positioned around the core. The curing of the enclosure enables the material forming the enclosure to be tested for imperfections prior to placement around the core, thereby preventing any unusable templates from being assembled using enclosures that do not completely enclose the core. In addition, the use of the preformed enclosures enables end caps of different materials to be utilized to provide various aesthetic and utilitarian benefits to the template.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings:

FIG. 7 is an end elevation view of the trial implant of FIG. 1;

FIG. 8 is an exploded view of the trial implant of FIG. 7;

FIG. 9 is an isometric view of another exemplary embodiment of a reusable surgical implement constructed according to the present disclosure;

FIG. 10 is a side elevation view of the implement of FIG. 9;

FIG. 11 is a cross-sectional view along line 11-11 of FIG. 10;

FIG. 12 is an isometric view of the implement of FIG. 9 after a first molding step;

FIG. 13 is a side elevation view of the implement of FIG. 12;

FIG. 14 is a cross-sectional view along line 14-14 of FIG. 13;

FIG. 15 is an isometric view of the implement of FIG. 9 after a second molding step;

FIG. 16 is a side elevation view of the implement of FIG. 15;

FIG. 17 is a cross-sectional view along line 17-17 of FIG. 16;

FIGS. 20A-20B are isometric views of the application of an adhesive to the core of FIG. 19;

FIGS. 21A-B are isometric views of the insertion of the core and adhesive into the interior of the enclosure of FIG. 18;

FIGS. 22A-B are isometric views of the removal of air bubbles from between the core and the enclosure;

FIG. 23 is an exploded isometric view of the attachment of end caps to the core and enclosure of FIG. 22;

DETAILED DESCRIPTION OF THE INVENTION

Figure 1:
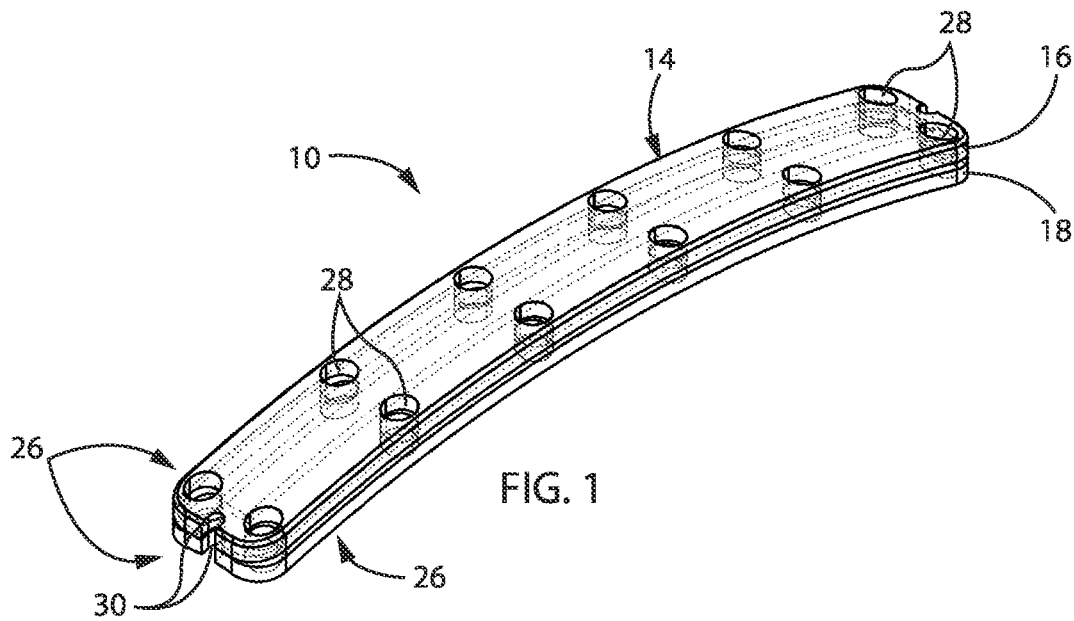
FIG. 1 is an isometric view of a one exemplary embodiment of a reusable surgical implement constructed according to the present disclosure.

Referring now in detail to the drawing figures, wherein like reference numerals represent like parts throughout the several views, one exemplary embodiment of a reusable surgical implement, formed as a trial or template implant constructed according to the present disclosure is illustrated generally at 10 in FIG. 1. As best shown in FIGS. 1-8, the implant 10 is formed of a central core 12 and an enclosure 14 disposed around the core 12 formed of an upper portion 16 and a lower portion 18. In the illustrated embodiment, the implant 10 is formed with a pre-curved shape, though other configurations for the implant 10 are also contemplated as being within the scope of the disclosure of the present invention.

Figure 2:
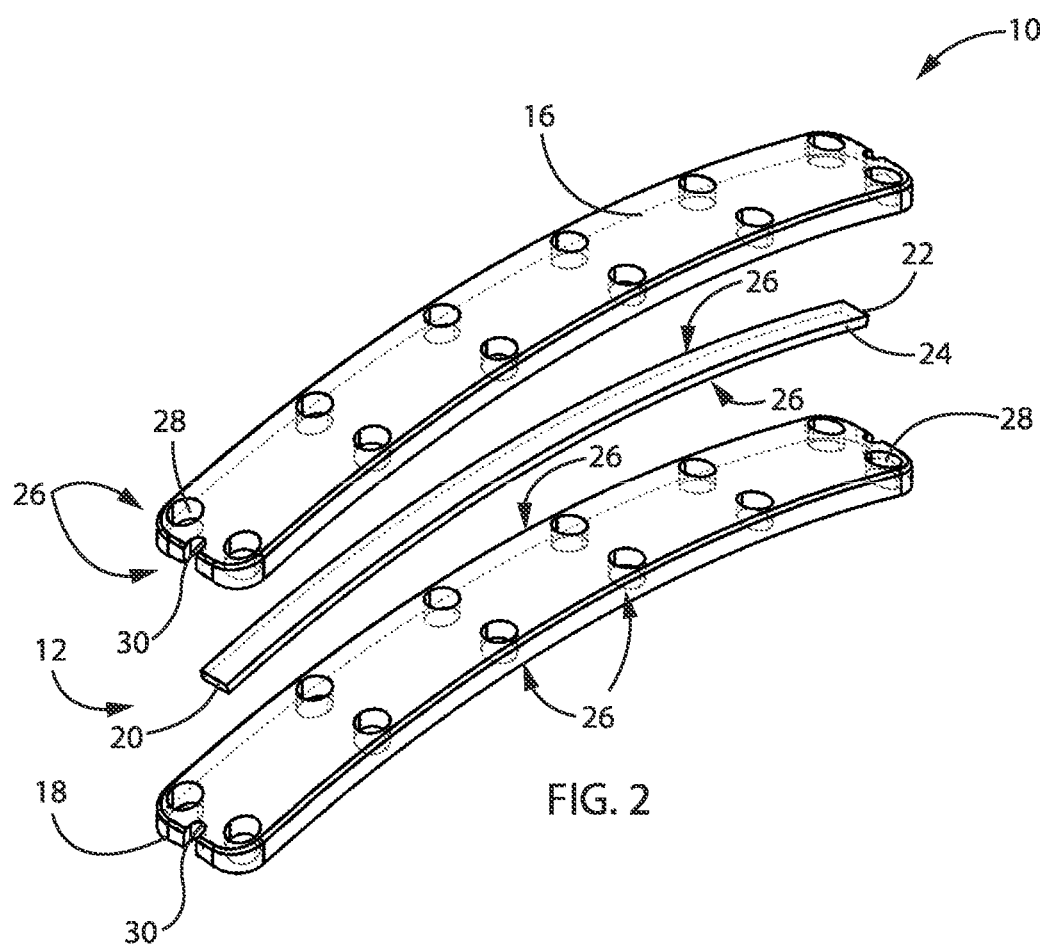
FIG. 2 is an exploded view of the trial implant of FIG. 1.
Figure 3:
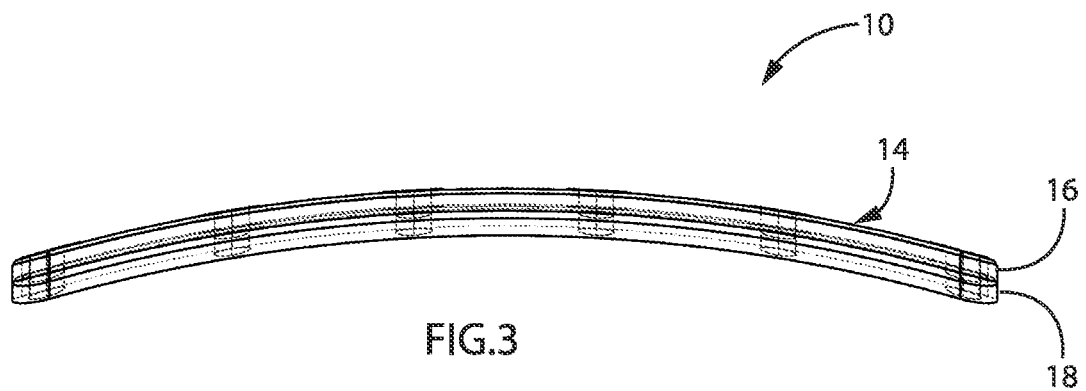
FIG. 3 is a side elevation view of the trial implant of FIG. 1.
Figure 4:
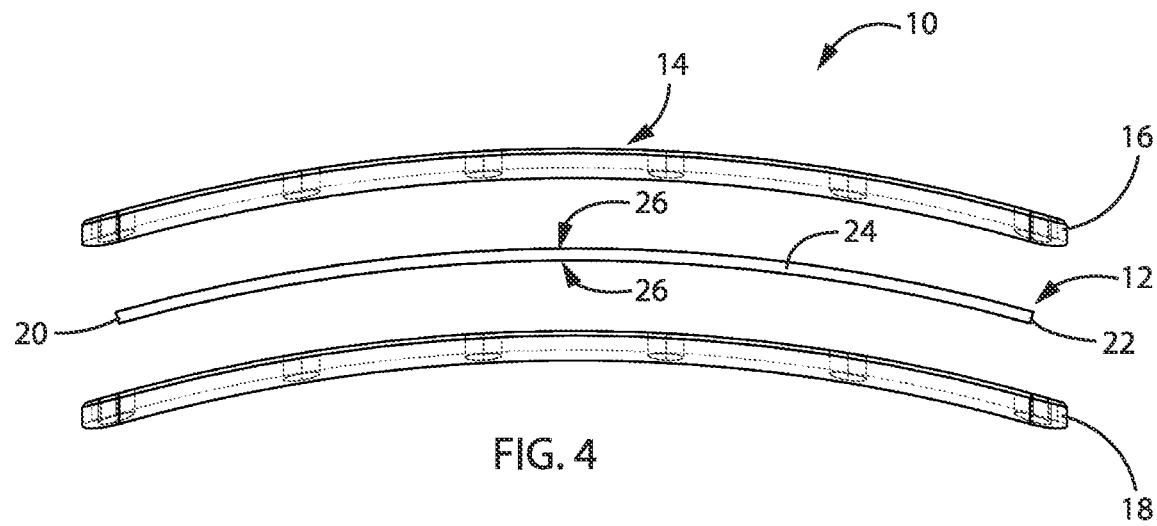
FIG. 4 is an exploded view of the trial implant of FIG. 3.
Figure 5:
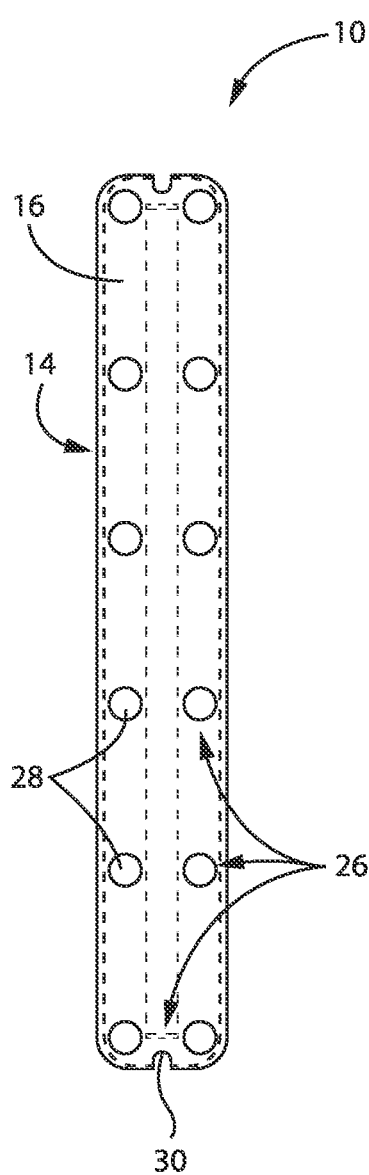
FIG. 5 is a top plan view of the trial implant of FIG. 1.
Figure 6:
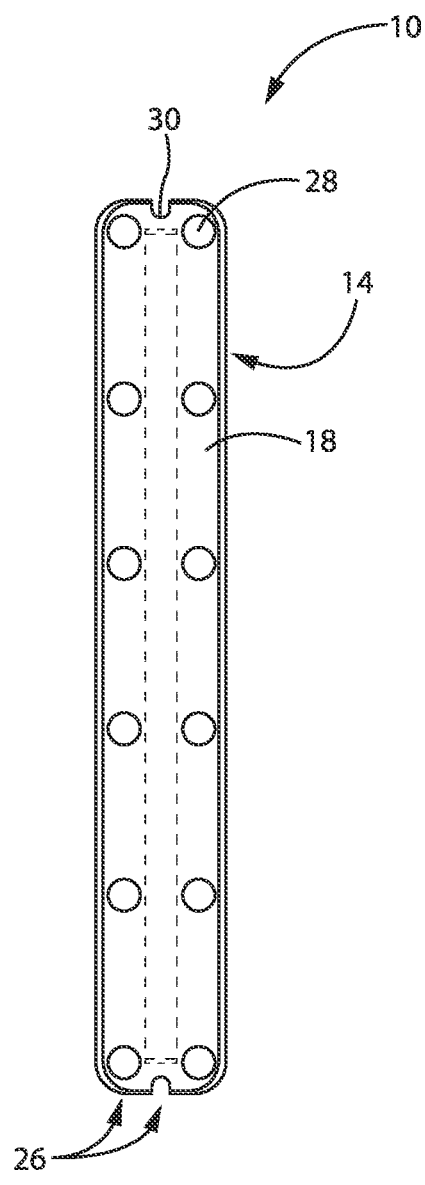
FIG. 6 is a bottom plan view of the trial implant of FIG. 1.

Referring now to FIGS. 2, 4 and 8, though any suitable shape for the core 12 can be utilized, in the illustrated embodiment the core 12 is formed with a generally rectangular configuration with a first end 20 and a second end 22 joined by opposed sides 24. In the illustrated embodiment the core 12 is also formed to be generally rectangular in cross-section with a pair of generally flat opposed surfaces 26 joining the ends 20, 22 and the sides 24, though any suitable cross-sectional shape can be utilized to impart the desired amount of flexibility to the core 12. The core 12 is shaped in any suitable machine and/or process to provide the desired shape for the core 12, such as a curved shape, which may include apertures or other features therein, as desired.

The material forming the core 12 is selected to be a generally rigid, but flexible material that can be altered in shape by applying a physical force to the core 12. Once, the force is removed, the core 12 remains in the shape to which it was altered by the applied force. In one embodiment of the core 12, the core 12 is formed of a shape memory material, such as a shape memory metal alloy, including the materials marketed under the trade name Nitinol® by Nitinol Devices & Components, Inc. of Fremont, CA.

The enclosure 14 is disposed around the core 12 and each portion 16 and 18 of the enclosure 14 is formed of a biologically inert and suitably flexible material that can conform to the shape of the core 12 in any configuration for the core 12, as well as being capable of withstanding the conditions normally employed in a sterilization process for the implant 10. In one embodiment, the material forming the portions 16 and 18 of the enclosure 14 is a silicone, such as a silicone rubber, including a high consistence rubber (HCR).

The portions 16 and 18 of the enclosure 14 are formed with features 26 that are identical or at least similar to those of the actual implant (not shown) to be secured within the body of the patient, to provide an accurate representation of the proper location of the actual implant in the body. The features 26 can include apertures 28 and notches 30, among others. The apertures 28 can extend completely through the respective portions 16 and 18 without intersecting the core 12, thereby preserving the integrity of the enclosure 14 around the core 12. Further, the shape of the portions 16 and 18 forming the enclosure 14 can be shaped as desired to approximate the shape of the actual implant. Also, the shape of the portions 16 and 18 can be selected independently of the shape of the core 12, or to conform to the shape of the core 12, as desired.

In one embodiment, the trial implant 10 is formed by initially forming the core 12 of the desired material in any suitable manner, such as by extruding or molding the material into the desired shape for the core 12. The core 12 is then placed within a suitable mold to enable the material selected form either the upper portion 16 or the lower portion 18 to be introduced into the mold containing the core 12 and form a portion of the enclosure 14 on or over the core 12 that contains the desired features 26. Any suitable molding process can be utilized to form the upper portion 16 or lower portion 18 around the core 12.

Subsequently, the core 12 and the portion 16 or 18 molded onto or over the core 12 are removed or transferred from the first mold and placed within a separate or second mold used to form the other of the upper portion 16 or the lower portion 18 on or over the core 12 in connection with the first portion 16 or 18 and with the desired features 26. The material selected to form the other portion 16 or 18 can be selected to be the same or different than the material used to form the first portion 16 or 18, to provide the desired attributes to the enclosure 14 and the implant 10, so long as the materials forming the upper portion 16 and lower portion 18 are capable of mating, co-mingling or otherwise joining to one another in the molding process to form the enclosure 14 around the core 12. Additionally, suitable materials can be applied to one or both of the portions 16 and/or 18 to properly affix the portions 16 and 18 to one another, such as an adhesive, either during molding of the portions 16 and 18 to one another, or when affixing pre-molded portions 16 and 18 to one another around the core 12.

In alternative embodiments, the portions 16 and 18 can be formed subsequently or simultaneously within a single mold in any suitable molding process.

In use, the implant 10 in a sterile condition is placed within the body of a patient and bent, such as by hand, to conform the implant 10 to the shape desired for the actual implant within the body. In this position and shape, the location for suitable securing members, such as screws, are marked using the positions of the various features 26 formed in the implant 10. The implant 10 can then be removed and replaced by the actual implant which is affixed within the body of the patient using the marked locations for the securing members.

Once removed from the body, the implant 10 can be cleaned and sterilized for additional uses. When sterilized, the heat used to sterilize the implant 10 can also activate the material forming the core 12 protected within the enclosure 14 to return the core 12, and correspondingly the implant 10, to its initial, pre-bent configuration or shape, thus making the implant 10 ready for use once the sterilization process has been completed.

As best shown in FIGS. 9-17, a second exemplary embodiment of the implement is formed as a rod template 100 having a central core 12' and an enclosure 14' disposed around the core 12' formed of a first component or portion(s) 16' and a second component or portion(s) 18'. In the illustrated embodiment, the rod template 100 is formed similarly to the implant 10, and can be generally straight, though other configurations for the rod template 100 are also contemplated as being within the scope of the disclosure of the present invention.

Though any suitable shape for the core 12' can be utilized, in the illustrated embodiment the core 12' is formed as an elongate member with a generally flat rectangular or cylindrical cross-sectional shape with a first end 20' and a second end 22' joined by opposed sides 24', though any suitable cross-sectional shape can be utilized to impart the desired amount of flexibility to the core 12'. The core 12' is shaped in any suitable machine and/or process to provide the desired shape for the core 12', which may include apertures or other features therein, as desired.

The material forming the core 12' is selected to be a generally rigid, but flexible material that can be altered in shape by applying a physical force to the core 12'. Once, the force is removed, the core 12' remains in the shape to which it was altered by the applied force. In one embodiment of the core 12', the core 12' is formed of a shape memory material, such as a shape memory metal alloy, including the materials marketed under the trade name Nitinol® by Nitinol Devices & Components, Inc. of Fremont, CA.

The enclosure 14' is disposed around the core 12' and each portion 16' and 18' of the enclosure 14' is formed of a biologically inert and flexible material that can conform to the shape of the core 12' in any configuration for the core 12'. In one embodiment, the material forming the portions 16' and 18' of the enclosure 14' is a silicone, such as a silicone rubber, including a high consistence rubber (HCR).

The portions 16' and 18' of the enclosure 14' are formed with any features (not shown) desired to enhance the utility of the implement 100 when utilized within the body of the patient. The features can include apertures (not shown) and notches (not shown), among others. The apertures can extend completely through the respective portions 16' and 18' without intersecting the core 12', thereby preserving the integrity of the enclosure 14' around the core 12'. Further, the shape of the portions 16' and 18' forming the enclosure 14' can be shaped as desired. Also, the shape of the portions 16' and 18' can be selected independently of the shape of the core 12', or to conform to the shape of the core 12', as desired.

In the illustrated embodiment, the implement 100 is formed by initially forming the core 12' of the desired material in any suitable manner, such as by extruding or molding the material into the desired shape for the core 12', as shown in FIGS. 9-11. The core 12' is then placed within a suitable mold to enable the material selected to form the first portion 16' to be introduced into the mold containing the core 12' and form a portion of the enclosure 14' on or over the core 12' that contains the desired features. Any suitable molding process can be utilized to form the first portion 16' around the core 12', such as those shown in commonly owned U.S. Pat. No. 8,641,955 and its related applications, each of which are expressly incorporated by reference herein in their entirety. In the illustrated embodiment best shown in FIGS. 12-14, the first portion 16' constitutes a number of spaced sections 102 disposed along the length of the core 12'.

Subsequently, the core 12' and the first portion 16' molded onto or over the core 12' are removed or transferred from the first mold and placed within a separate or second mold used to form the other of the second portion 18' on or over the core 12' in connection with the first portion 16' and with the desired features. The material selected to form the second portion 18' can be selected to be the same or different in one or more respects or attributes than the material used to form the first portion 16', in order to provide the desired attributes to the enclosure 14' and the implement 100, so long as the materials forming the first portion 16' and second portion 18' are capable of mating, co-mingling or otherwise joining to one another in the molding process used to form the enclosure 14' around the core 12', which can be the same or different that the process used to form the first section 16'. Additionally, suitable materials can be applied to one or both of the portions 16' and/or 18' to properly affix the portions 16' and 18' to one another, either during molding of the portions 16' and 18' to one another, or when affixing pre-molded portions 16' and 18' to one another around the core 12'.

In alternative embodiments, the portions 16' and 18' can be formed subsequently or simultaneously within a single mold in any suitable molding process. In the illustrated embodiment, the second portion 18' includes a number of spaced sections 104 disposed along the length of the core 12' alternating in a sequential manner between and joining the sections 102 to form the enclosure 14'. In this embodiment, as shown in FIGS. 15-17, the sections 102 and 104 form a seamless enclosure 14' around the core 12' complete with end caps 106 disposed over each end 20,22 of the core 12, which can be molded with either of the sections 102 or 104, or separately therefrom. The seamless enclosure 14' moves and/or flexes with the core 12' to retain the core 12' encased within the enclosure 14', such that the sterilization of the implement 100 does not contact the core 12'. In addition, in an alternative exemplary embodiment, the sections 102,104 can be molded with the same dimensions but with different colors such that each colored section 102,104 is a length marking indicia for the implement 100 that cannot be eroded like ink markings on the surface of the enclosure are prone to be. The length markings/sections 102,104 are easily visible from any orientation, and the length demarcations are very consistent since they are dictated by the mold cavity which remains of a consistent size.

Figure 18:
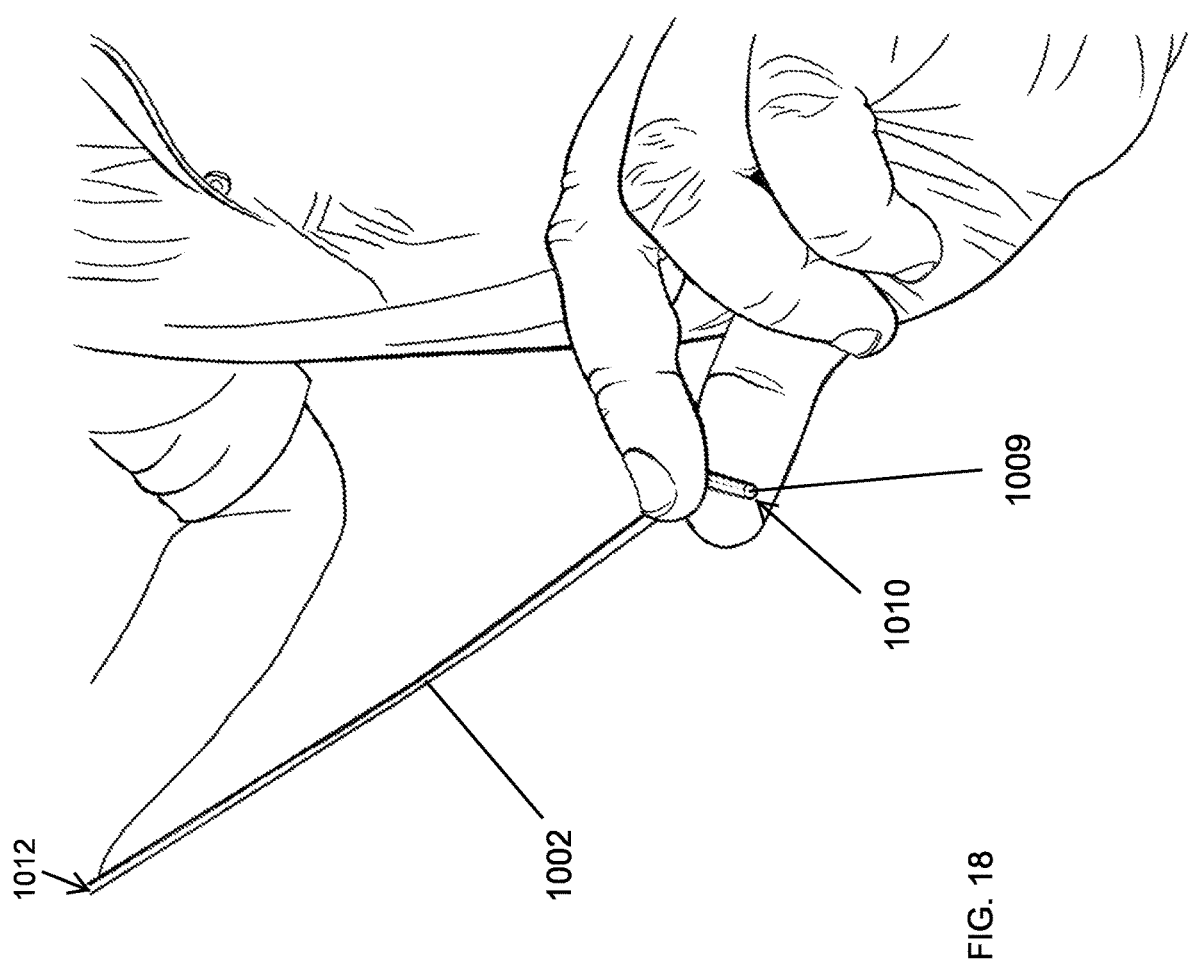
FIG. 18 is an isometric view of an enclosure formed according to an exemplary embodiment of the present disclosure.

Referring now to FIGS. 18-25, an exemplary, alternative method and construction for the implement 1000 is illustrated. The implement 1000 (FIG. 24) is initially constructed by forming and enclosure 1002 of a material similar to that utilized for the enclosures 14,214. The enclosure 1002, as best shown in FIG. 18, is formed of the specified material, e.g. a silicone rubber, or a santoprene elastomer, in a suitable molding or extrusion process in order to form the enclosure 1002 as a hollow tube having an inner diameter similar to, and optionally slightly less than that of a core 1004, and in one exemplary embodiment with a diameter that is slightly less than that of the core 1004.

The enclosure 1002 is cured after formation in any suitable manner, such as by placement in an oven (not shown) at a suitable temperature for a suitable amount of time, such that the enclosures 1002 can generally retain their tubular shape when employed to form or construct the implement 1000. The curing of the enclosures 1002 serves to reduce the volatile components remaining in the material forming the enclosure 1002, which in turn enhances the ability of an adhesive 1006 to adhere to the interior surface of the enclosure 1002. Further, either prior to or after curing, the enclosure 1002 is trimmed at each end, such that the enclosure 1002 has the form of a hollow tube defining an open interior 1009 with a pair of open ends 1010,1012, as best shown in FIG. 18.

Figure 19:
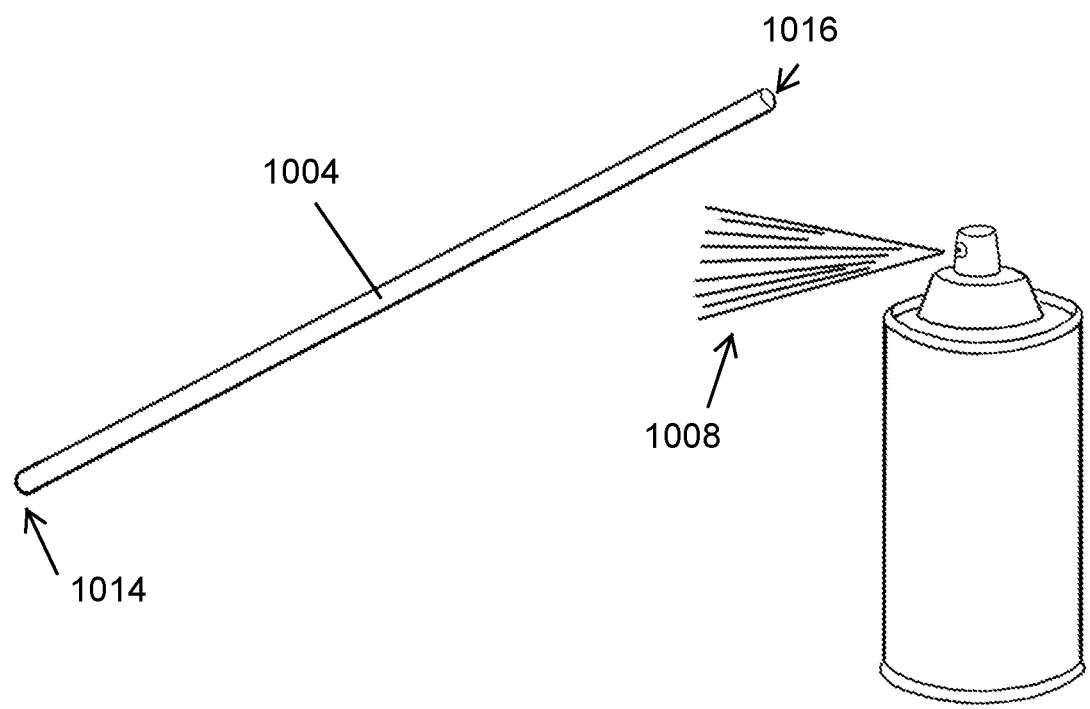
FIG. 19 is an isometric view of the application of a primer to a core formed according to an exemplary embodiment of the preset disclosure.
Figure 20B:
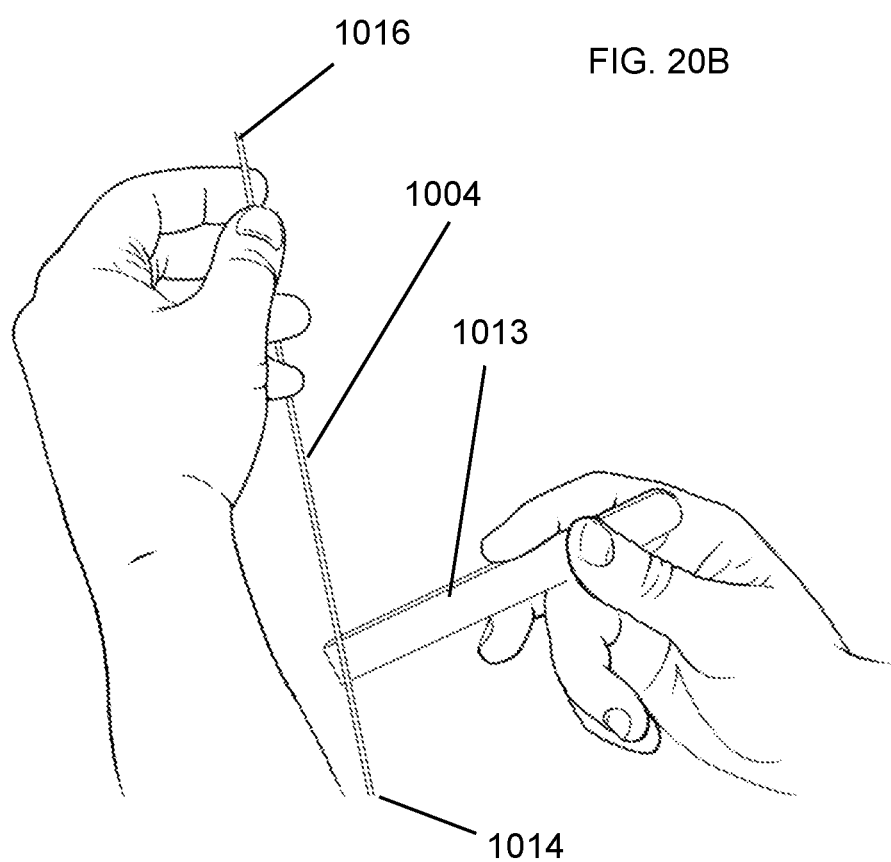

Referring now to FIGS. 19-20B, the core 1004, which is formed similarly to the core 12,212, and has a pair of ends 1014,1016 that define a length for the core 1004 shorter than the overall length of the enclosure 1002, is coated on its exterior with an amount of a primer material 1008, such as MED1-161 silicone primer, which operates to enhance the ability of the adhesive 1006 to adhere to the exterior of the core 1004.

The adhesive is de-gassed to remove bubbles formed therein during the mixing process. This is done by placing the adhesive mixture in an open container in a vacuum chamber (not shown). Bubbles trapped in the adhesive layer are weak points in the finished device/implement 1000, that could lead to points of failures in the device/implement 1000 and in particular the enclosure 1002, as any bubbles present would expand when the device/implement 1000 is heated during sterilization and could cause the enclosure 1002 to expand and rupture when heated during sterilization. in addition, areas in the device/implement 1000 with trapped bubbles therein are considered thinner walls since there is not enough adhesive backing and these areas could be vulnerable to perforation.

After the primer 1008 has suitably bonded to the exterior of the core 1004, as shown in FIG. 19, an amount of the adhesive 1006, which in an exemplary embodiment is MED 6015 epoxy is applied to the exterior of the core 1004 over the primer 1008. The application of the adhesive 1006 to the core 1004 can be performed in any suitable manner, but in an illustrated exemplary embodiment of FIGS. 20A-20B, is applied by manually spreading the adhesive 1006 onto the exterior of the core 1004, such as by applying the adhesive 1006 to an application tool 1013 which is subsequently used to spread the adhesive 1006 generally evenly onto the core 1004. In order to avoid excess adhesive 1006 from hindering the insertion of the core 1004 into the enclosure 1002, in an exemplary embodiment the adhesive 1006 is initially applied to only a portion of the core 1004, such as to leave a portion of the core 1004 adjacent the end 1016 opposite the open end 1010 able to be grasped for manipulation of the core 1004, such as for twisting the core 1004 as it is inserted into one open end 1010,1012 of the enclosure 1002. In another exemplary embodiment, the adhesive 1006 is applied to the core 1004 when the core 1004 is oriented vertically, such that the adhesive 1006 will run downwardly along the core 1006 from one end 1016 towards the opposed end 1014 of the core 1004 that is to be inserted initially into the enclosure 1002.

Once the adhesive 1006 is placed on the portion of the core 1002, at and near the end 1014, the end 1014 of the core 1002 is inserted into the open end 1010 of the enclosure 1002, as illustrated in FIGS. 21A-21B. As the core 1004 is pressed into the interior 1009 of the enclosure 1002, the enclosure 1002 is slightly stretched and/or expanded to accommodate the volume of the core 1004 within the interior 1009 of the enclosure 1002. This creates a tight fit between the core 1004 and the enclosure 1002, such that any excess adhesive 1006 is removed from the exterior of the core 1004 as it is inserted into the enclosure 1002. As the excess adhesive is removed from the core 1004, it collects at the open end 1010 of the core 1004 and is removed.

Further, any adhesive that may exit the enclosure 1002 through the opposite open end 1012 can be collected in a container for re-application to the core 1004 or in a subsequent procedure.

The adhesive 1006 in the uncured state on the core 1004 also acts as a lubricant to assist in the insertion of the core 1004 into the enclosure 1002. As the core 1004 moves into the enclosure 1002, additional adhesive 1006, such as the adhesive 1006 removed from the open end 1010 of the enclosure 1002 is applied to the sections of the core 1004 near the open end 1010 to facilitate the insertion and adherence of the core 1004 within the enclosure 1002. In other exemplary embodiments, an electric fluid injector needle 1100 (FIG. 25) with a nozzle 1102 insertable within the enclosure 1002 and that is operably connected to a pressurized fluid injector (not shown) can be used to inject an amount of adhesive 1006 directly within the interior 1009 of the enclosure 1002 around the core 1004 to assist in the insertion of the core 1004 within the enclosure 1002.

When the opposite end 1016 of the core 1004 approaches the open end 1010 of the enclosure 1002, pressure is applied directly to the end 1016 to press the entirety of the core 1004 into the enclosure 1002, such as by placing the adhesive application and insertion tool 1013 against the end 1016 and pushing the tool 1013 and end 1016 towards the open end 1010 of the enclosure 1002.

Once the end 1016 is disposed flush with the open end 1010, the core 1004 can be further pressed into and within the enclosure 1002 past the open end 1010 using an insertion tool 1018. The tool 1018 has a diameter approximately equal to the core 1004, and smaller than the enclosure 1102, and can be positioned on the end 1016 to further press the core 1004 into the enclosure 1002.

In an exemplary embodiment, the core 1004 is inserted within the enclosure 1002 to a position where the ends 1014,1016 are equidistant from the adjacent open ends 1010,1012, such that the core 1004 is centered within the enclosure 1002. Any excess length of the enclosure 1002 past either end of the core 1004 accommodates for movement or shifting of the core 1004 within the enclosure 1002 during further processing of the device/template 1000.

Figure 22B:
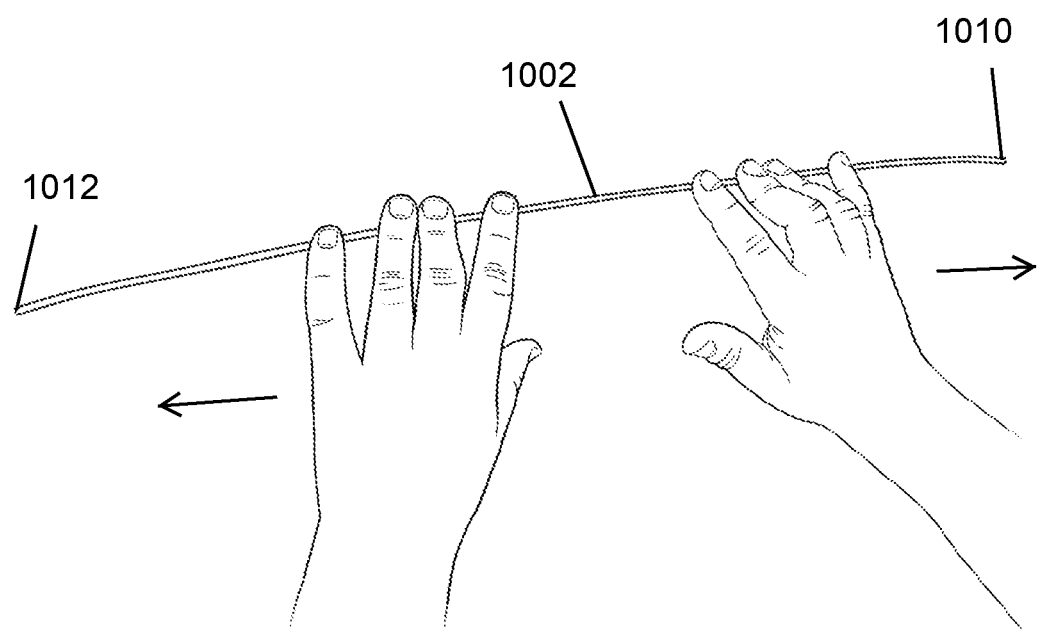

After the core 1004 is completely and properly positioned within the enclosure 1002, the enclosure 1002 is manipulated to press any air bubbles present in the adhesive 1006 between the enclosure 1002 and the core 1004. In an exemplary embodiment, the enclosure 1002 is manipulated by rolling the enclosure against a hard surface (not shown) to force the any bubbles outwardly towards the open ends 1010,1012 of the enclosure 1002, as best shown in FIGS. 22A-22B. This rolling can be performed mechanically or by hand. Further, in an exemplary embodiment, the manipulation initially take place at the center of the enclosure 1002 (FIG. 22A) and moves outwardly toward the ends 1010, 1012 (FIG. 22B) to urge the bubbles outwardly through the open ends 1010, 1012. The manipulation can be performed in stages, with an initial stage using a coarser manner of manipulation to displace larger bubbles, followed by a finer manner of manipulation to displace any remaining smaller bubbles.

Once the bubbles have been displaced from within the adhesive 1006, the enclosure 1002 is cleaned to remove any excess adhesive 1006 and/or other contaminants from the exterior of the enclosure 1002. The enclosure 1002 and core 1004 can then be cured to set the adhesive 1006 between the enclosure 1002 and the core 1004 to form the template 1000.

Figure 24:
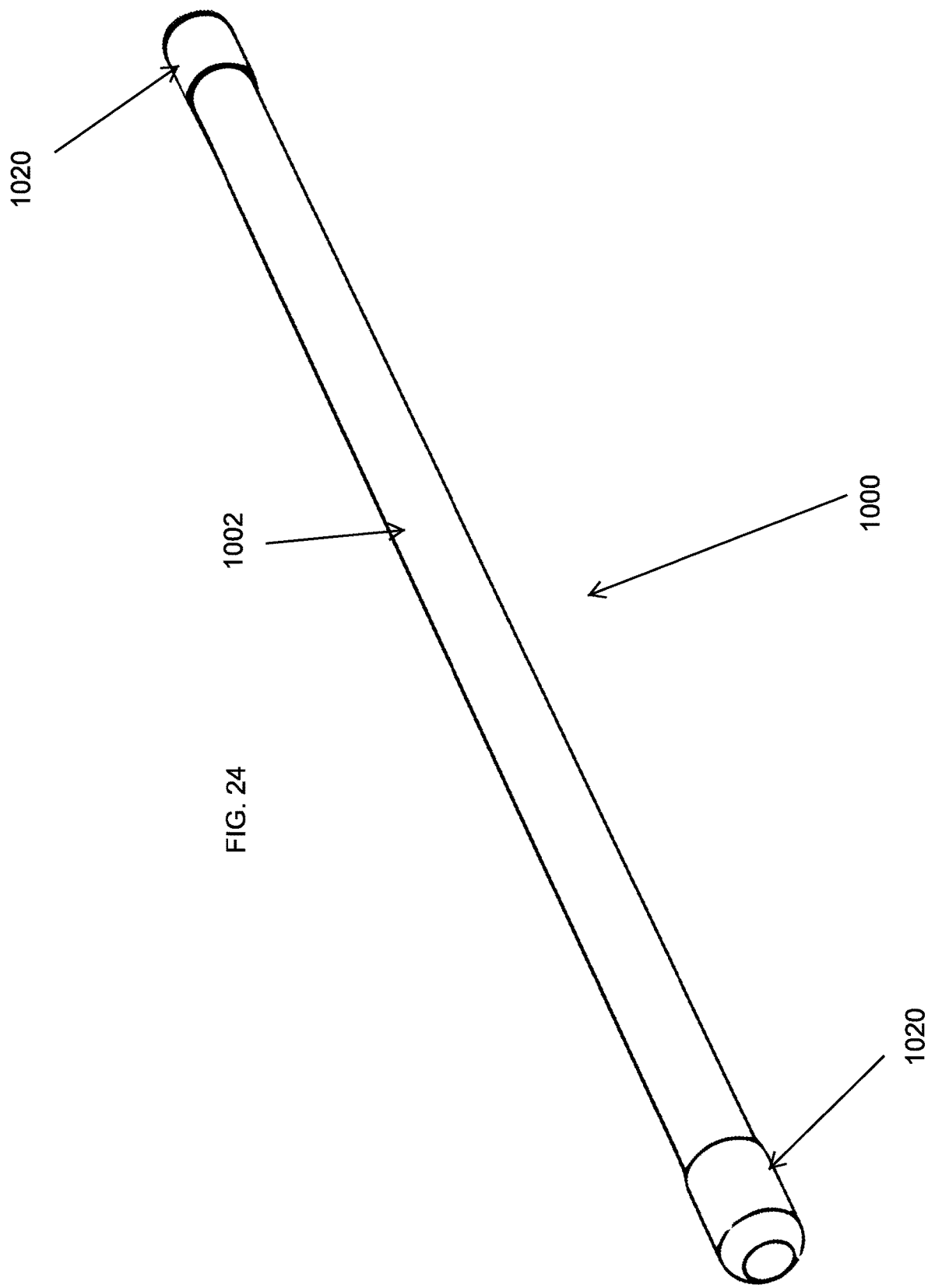
FIG. 24 is an isometric view of the assembled implement according an exemplary embodiment of the present disclosure.
Figure 25:
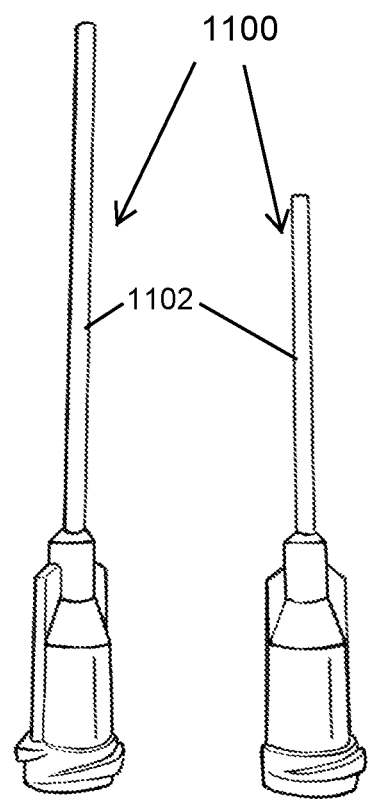
FIG. 25 is a top plan view of insertion tools used to insert the core into the enclosure as in FIG. 21.

After curing, the open ends 1010,1012 of the enclosure can be trimmed and or sealed, such as by melting the material forming ends 1010,1012 to completely close off the ends 1010,1012, thereby providing the sterilization-tolerant enclosure for the finished template 1000. In an alternative exemplary embodiment, as shown in FIGS. 23-24, a separate end cap 1020 can be positioned over and/or attached to the enclosure 1002 at the ends 1014,1016 of the core 1004. The end caps 1020 can be formed of a suitable metal or a polymer compatible with the material forming the enclosure 1002, and can be secured thereto in any suitable manner. The end caps 1020 operate to protect the ends of the template 1000 from mechanical damage that could expose the core 1004. Another benefit of the end caps 1020 is they can be color coded for branding or to match to a group of surgical instruments used on the same implant system. End caps 1020 can be coated to achieve various colors or in the case of polymers, they can be molded in various colored materials. End caps 1020 can be marked with processes such as laser marking. End caps 1020 provide an aesthetically appealing and consistent end appearance to cover up uneven end surfaces.

In an alternative exemplary embodiment for the implement 10,100,1000, the end caps 1020 can be formed as a part of the core 1004, such that the end caps 1020 define a reduced diameter section of the core 1004 between the caps 1020. The caps 1020 can be brazed or welded to the ends 1014,1016 of the core 1004 and provide stops for the molding or positioning of a molded enclosure 1002 over the reduced diameter section of the implement 10,100,1000 defined between the end caps 1020. With this construction for the core 1004, a faster molding process can be used, and/or multiple devices can be molded simultaneously thereby reducing the manufacturing time. Further, the ends caps 1020 keep the core 1004 from becoming damaged after repeated uses. The end caps 1020 may have slightly tapered or rounded ends allowing them to be easily inserted through structures in the body of a patient as needed.

Various other embodiments of the present disclosure are contemplated as being within the scope of the filed claims particularly pointing out and distinctly claiming the subject matter regarded as the invention.

The invention claimed is:

1. A method of forming a reusable surgical implement, the method comprising the steps of:
 a) forming a core;
 b) forming a tubular enclosure having a pair of opposed open ends;
 c) applying an adhesive to an exterior of the core;
 d) inserting the core within the enclosure to form the implement; and
 e) manipulating the enclosure and the core to remove bubbles from between the enclosure and the core, wherein the step of manipulating the enclosure and the core comprises rolling the enclosure and core against a hard surface.

2. The method of claim 1 wherein the step of forming the enclosure comprises extruding a material to form the enclosure.

3. The method of claim 2 wherein the material is a silicone rubber.

4. The method of claim 1 wherein the step of forming the enclosure comprises molding a material to form the enclosure.

5. The method of claim 2 wherein the material is a thermoplastic elastomer.

6. The method of claim 1 wherein the adhesive is a lubricating adhesive.

7. The method of claim 1 wherein the step of applying the adhesive to the core comprises applying the adhesive to only a portion of the exterior of the core.

8. The method of claim 1 wherein the step of inserting the core within the enclosure comprises pressing the core into one open end of the enclosure.

9. The method of claim 8 further comprising the step of twisting the core concurrently with pressing the core into the open end of the enclosure.

10. The method of claim 1 wherein the step of rolling the enclosure and core comprises:
 a) rolling the center of the enclosure and the core against a hard surface; and
 b) rolling the enclosure and the core against the hard surface outwardly from the center towards the ends of the enclosure.

11. The method of claim 1 further comprising the step of curing the adhesive between the enclosure and the core after manipulating the enclosure and the core.

12. The method of claim 1 further comprising the step of forming an end cap on each end of the enclosure after inserting the core within the enclosure.

13. The method of claim 12 wherein the step of forming the end cap comprises forming the open ends of the enclosure into the end caps.

14. The method of claim 12 wherein the step of forming the end cap comprises placing an end cap material over the open ends of the enclosure and the ends of the core.

* * * * *